United States Patent

[11] 3,554,258

[72] Inventor Richard J. Duffy
    Salem, Mass.
[21] Appl. No. 821,178
[22] Filed May 2, 1969
[45] Patented Jan. 12, 1971
[73] Assignee USM Corporation
    Flemington, N.J.
    a corporation of New Jersey

[54] SELF-LOCKING THREADED ELEMENT
    4 Claims, 2 Drawing Figs.

[52] U.S. Cl. ................................................. 151/7,
                                                           117/21
[51] Int. Cl. ..................................................... F16b 39/34
[50] Field of Search .......................................... 151/7, 14.5;
                                                    285/m; 117/21, 25

[56]            References Cited
         UNITED STATES PATENTS
3,061,455  10/1962  Anthony ..................  151/7

| 3,239,403 | 3/1966  | Williams et al. ........... | 285/m  |
| 3,294,139 | 12/1966 | Preziosi ...................... | 151/7  |
| 3,389,010 | 6/1968  | Burch .......................... | 117/18 |
| 3,464,473 | 9/1969  | Winslow ..................... | 151/7  |

FOREIGN PATENTS 690,770  4/1953  Great Britain ................ 151/7

Primary Examiner—Marion Parsons, Jr.
Attorneys—W. Bigelow Hall, Richard A. Wise and Benjamin C. Pollard ABSTRACT: A self-locking threaded element to give low but consistent resistance to displacement including a resin deposit on the threaded surface with spaced portions of greater thickness than intervening portions. The resin deposit may be formed by directing a stream of fine particles of heat softenable resin against a threaded surface portion of a heated metallic element under controlled conditions. Resin particles contacting the heated surface are caught and fused as a deposit of the desired contour and the resin is then hardened by cooling.

PATENTED JAN 12 1971

3,554,258

*Inventor*
Richard J. Duffy
By his Attorney
Benjamin C. Pollard

SELF-LOCKING THREADED ELEMENT

BACKGROUND OF THE INVENTION

1. Field of the Invention

This invention relates to improvements in self-locking threaded elements.

2. Description of the Prior Art

In my earlier filed application entitled "Self-Locking Threaded Elements and Methods of Making" Ser. No. 628,683, filed Apr. 5, 1967, now U.S. Pat. No. 3,498,352, there is disclosed a self-locking threaded element and method of making in which a stream of fine particles of heat softenable resin is directed against the heated surface of a threaded element which holds and fuses the resin particles as a continuous retarder patch extending smoothly from one axially extending edge of the patch to the opposite edge of the patch and with smoothly changing thickness of the patch from a maximum thickness midway between the longitudinal edges to minimum thickness adjacent the edges. Ordinarily, the deposit of plastic is so uniform as not greatly to alter the thread appearance.

Self-locking threaded fasteners with locking patches prepared in accordance with the earlier filed application have been eminently satisfactory for most uses and the invention has gone into extensive commercial use. However, for some specialty uses, the torque required to tighten or loosen the thread members of the prior application has been greater than desirable. Because of the variation in actual dimensions of threaded members of a given nominal size, efforts to provide lower torque requirement threaded members by using thinner resin deposits would not give consistent displacement preventing action.

It is an object of the present invention to provide a self-locking threaded element carrying a deposit of deformable resin on its threaded surface, the body having a contour to provide low but consistent locking resistance to displacement.

To this end and in accordance with a feature of the present invention I have provided a self-locking threaded element carrying resin on a selected area of the threaded surface in which there are areas in which the resin is relatively thick separated by areas in which there is no resin or only a thin layer of resin.

BRIEF DESCRIPTION OF THE DRAWING

The invention will be described further in connection with the attached drawing in which.

DESCRIPTION OF THE PREFERRED EMBODIMENTS

The invention will be described in its use to provide a self-locking resin body on a threaded bolt; but it is to be understood that it is useful in providing a self-locking body on threaded portions of other articles.

Figure 1:
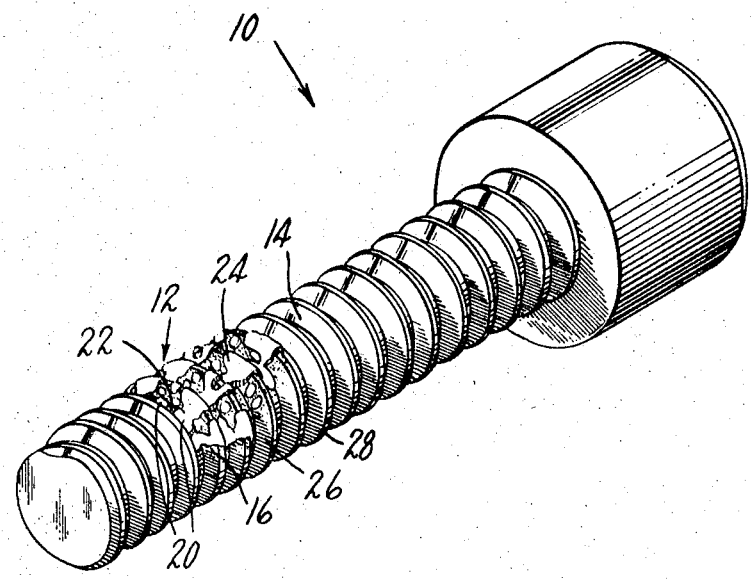
FIG. 1 is an enlarged perspective view of one form of self-locking threaded fastener element in accordance with the present invention.

A locking-type threaded element, shown as a bolt bolt 10 (see FIGS. 1 and 2) according to the present invention carries a deposit 12 of tough, resilient resin which may be formed in situ on a selected area of the threaded surface 14 of the fastener by deposition and fusion of fine particles of heat softenable resin on a heated surface of the fastener 10. A thin, heat softenable film 16 of primer or tying material disposed on the selected area between the surface of the fastener or bolt 10 and the deposited resin 12 may be provided to aid in deposition of the resin particles in the course of making and to give superior adhesion between the fastener surface and the resin deposit.

Figure 2:
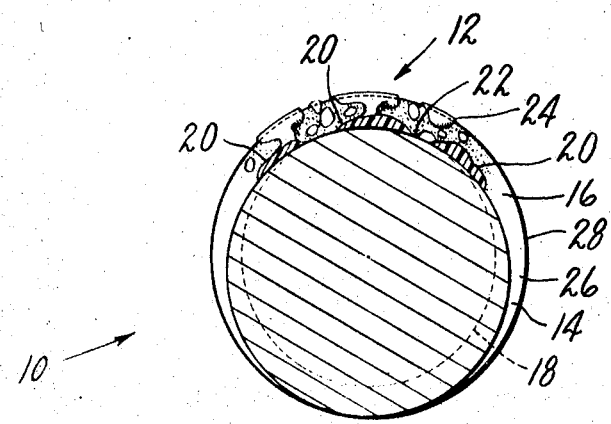
FIG. 2 is a cross sectional view on a larger scale taken through the shank of the threaded fastener.

Referring particularly to FIG. 2 of the drawing, it will be observed that the resin 12 in the valley portions 18 of the threaded surface is arranged in a plurality of mounds or portions of greater thickness 20 separated by areas 22 of the valley surface with no resin or a very thin deposit of resin. There is also resin 24 deposited on the inclined helical bearing surface 26 and the crests 28 of the threaded surface. The resin deposits on the bearing surface and crests should be relatively thin; but it does not appear to be important in these areas whether the deposit is continuous or discontinuous.

Allowable manufacturing tolerances as to dimensions of internal and external screw threads are determined by screw thread classes with the higher numbered classes having smaller tolerances. The term "maximum clearance" as used herein refers to that clearance which would exist between the crest of a thread of an externally threaded member having the minimum diameter and the valley of a mating internally threaded member having the maximum diameter in the ranges of dimensions acceptable for the class of thread member being treated.

It has been found that consistent resistance to displacement with a suitably low torque requirement for engagement and disengagement is obtained where the radial thickness of the mounds 20 of resin in the valleys 18 is from about 75 percent to about 150 percent of the "maximum as the term is defined above. The frictional resistance primarily relied on to give the desired locking action is that exerted between the resin mounds 20 in the valleys 18 and the thread surfaces at the crests and adjacent portions of the bearing surfaces of mating threads. The crests and adjacent portions deform the resin mounds 20 and the resin displaced is forced into the areas 22 of thin resin or no resin between the mounds 20. The action is effective even where the clearance between a given pair of mating threads is "maximum" because mounds 20 of the required thickness necessarily extend over adjacent portions of the bearing surface 26 and the clearance between bearing surfaces of mating threaded members is sufficiently less than the clearance between crests and valleys of mating threaded members that resin-deforming locking engagement is secured. Consistent low torque locking action is obtained, since in every case notwithstanding variations in the actual dimensions of assembled threaded elements, the resin mounds 20 in the valleys 18 will be deformed readily to an extent which will give them low but effective and consistent locking action.

Deposition of resin on the threaded surface may be effected by procedure employing generally the same steps, materials and apparatus, but under different conditions than those described in my copending application above referred to. The description of the materials including primers and resins, manipulation and apparatus of the patent which issued on that application are incorporated in the present application by reference.

Summarized briefly, the steps of the procedure involve suspending a threaded fastener on a conveyor and moving it first past a device such as spray or brush for applying a primer or tying coat of heat softenable material which may be permanently thermoplastic or a temporary heat softenable material which is later cured. The primer coat is dried and the fastener is carried to a heating station, preferably a high frequency field unit. While hot, the fasteners are moved to a station where fine heat softenable resin particles are applied to the threaded surface preferably as a stream of particles suspended in a jet of gas such as air. Particles are caught and held on the hot surface and fused to a coherent mass by the sensible heat of the fasteners. Thereafter, the fasteners are cooled and the deposited resin forms a coherent, tough, resilient body. As pointed out in the referred-to-application, the primer provides the special advantages that it is softened by the heating step and thus aids in collecting and holding resin particles from the stream and in addition the primer improves the strength of union holding the deposited resin on the fastener.

In the self-locking threaded fastener of the present invention, the novel conformation of the deposited resin, namely in the form of spaced mounds 20 of resin in the valleys 18 of the threads with spaces 22 between the mounds relatively thin or free from resin is secured by special controls. That is, it had heretofore been considered important to provide a smooth continuous coating of resin and procedures and controls were worked out to insure such a coating. The conditions involved to secure such coatings were a controlled rate of passage of the heated fastener through the stream of particles and a rate of gas flow and resin particle feed effective to give this smooth coating.

It has now been found that the low but consistent locking action deposit of the present invention may be formed by reducing the rate of supply of resin particles to the stream to a value which may be from about 5 percent to about 50 percent of the rate of feed of resin particles used to from a uniform coating. Desirably the rate of gas flow is also reduced by from about 5 to about 20 percent below the values used in forming a smooth coating for a given size of three threaded fastener. While it is not fully understood why these changes should produce the desired novel locking resin deposit, it appears that the lower rate of resin particle feed favors buildup of resin on areas which have already received some resin to cause accumulation of resin in spaced mounds 20. Likewise the reduced rate of gas flow in the particle stream has less tendency to cause the resin particles to be distributed uniformly over the surface of the threaded fastener 10.

The locking action of the deposited resin will vary with the quantity of resin applied. In general, while sufficient resin will be applied so that the mounds 20 have a radial thickness from about 75 percent to about 150 percent of the "maximum clearance," the total quantity of resin deposited will be less than the amount needed to form a deposit in the valley 18 of thickness equal to the maximum clearance.

The following example is given as of possible assistance is in understanding the invention and it is to be understood that the invention is not limited to the materials, conditions or procedures set forth in the Example.

One-fourth inch-28 UNF-3A screws for torque test purposes were disposed with their enlarged head portions resting on two horizontally extending closely spaced moving belts with the threaded portions extending down between the belts leaving the portions to be coated exposed. The screws were first carried past a spray device which deposited a thin layer of primer solution on exposed portions of the screws on which locking deposits of resin were to be formed. The primer was 10 percent solids solution in alcohol of an alcohol soluble nylon and an epoxy resin (Epon 828) in the ratio of solids of 90:10 parts by weight. The deposited material on the screws was dried leaving very thin substantially continuous primer coats. The screws were then conveyed in proximity to a high frequency field coil operating at a frequency of 450 kc. with a power source of 2 kw. capacity. In passing through the field the temperature of the screws reached about 600° F. Directly thereafter and while still hot the screws were moved by the belts so that the primer coated area of the screws passed through a laterally directed stream of powdered polyamide resin (Nylon 11). The powder had a particle size distribution such that less than 2 percent were retained on No. 70 sieve, 90 percent were retained on a No. 140 sieve and about 5 percent passed a No. 325 sieve. The heat softened primer layer on the surface of the screws caught and held powder particles and the powder particles were fused by heat from the screws to form a firmly adherent resin deposit. The area on which resin was deposited was about ⅛ inch in axial length extending around 120° of circumference. On cooling, the screws were torque tested using a class 3 fit cadmium plated nut and following the procedures set forth in Military Specification MIL-F-18240.

In the above coating procedure, the controls were first set to provide a continuous smooth resin deposit. Using a nozzle for directing the stream of powder particles having a dimension perpendicular of the axis of the screw of ⅛ inch and a dimension in the direction of travel of the screw 1 inch, it was found that with an air supply of 15 to 18 cubic feet of air per hour and a resin feed of 7 to 8 grams per minute, a smooth continuous resin patch was obtained.

To produce a self-locking resin deposit according to the present invention, the resin supply was cut down to 4½ grams per minute for first locking deposit and formed screws in which mounds about 0.010 inch in radial thickness in the valleys of the threads was obtained.

A second series of screws was prepared in which the resin supply was cut down to one gram per minute and the air supply was cut down to 13 to 14 cubic feet per hour.

A third series of screws was prepared in which the resin supply was cut down to one-half gram per minute and the air supply was maintained at 13 to 14 cubic feet per hour.

The results in terms of torque of the various series of screws using nuts of class 3A which would provide a maximum clearance of 0.013 inch are listed in the following table.

| | Cu. ft. of air/min. | Torque, in./lbs. | Torque, 3d out |
|---|---|---|---|
| Full patch, grams: | | | |
| 7-8 | 15-18 | (1) | (2) |
| 4½ | 17-18 | 20-33 | 8½-10 |
| 1 | 13-14 | 6-13 | 5-8 |
| ½ | 13-14 | 6-10 | 3-5 |

1 More than 35.
2 More than 15.

Having thus described my invention what I claim as new and desire to secure by Letters Patent of the United States is:

I claim:

1. A self-locking threaded fastener element with low but consistent resistance to displacement from threaded engagement with a complementary element, said fastener element including normally hard, tough, resilient, heat softenable resin adhered on a selected area of the normal thread surface of said fastener element characterized in that the adhered resin is in the form of spaced mounds of resin in the valleys between the threads of said threaded element with the spaces between mounds in a given valley being free from resin or having less radial thickness of resin than the radial thickness of said mounds of resin, the radial thickness of said mounds of resin being at least 75 percent of the maximum clearance of the thread system to be locked.

2. A self-locking threaded fastener element as defined in claim 1 in which the radial thickness of said mounds of resin is from about 75 percent to about 150 percent of the maximum clearance of the class of thread member being treated.

3. A self-locking threaded fastener element as defined in claim 2 in which a resin primer coat is disposed between the threaded surface and the resin.

4. A self-locking threaded fastener element as defined in claim 3 in which the total resin in a given valley if distributed in uniform thickness would have a thickness less than the maximum clearance of the class of thread member being treated.